Dec. 21, 1954  J. P. GOMES  2,697,318
DRIVE MECHANISM FOR ROTARY BEET LIFTERS
Filed June 30, 1952
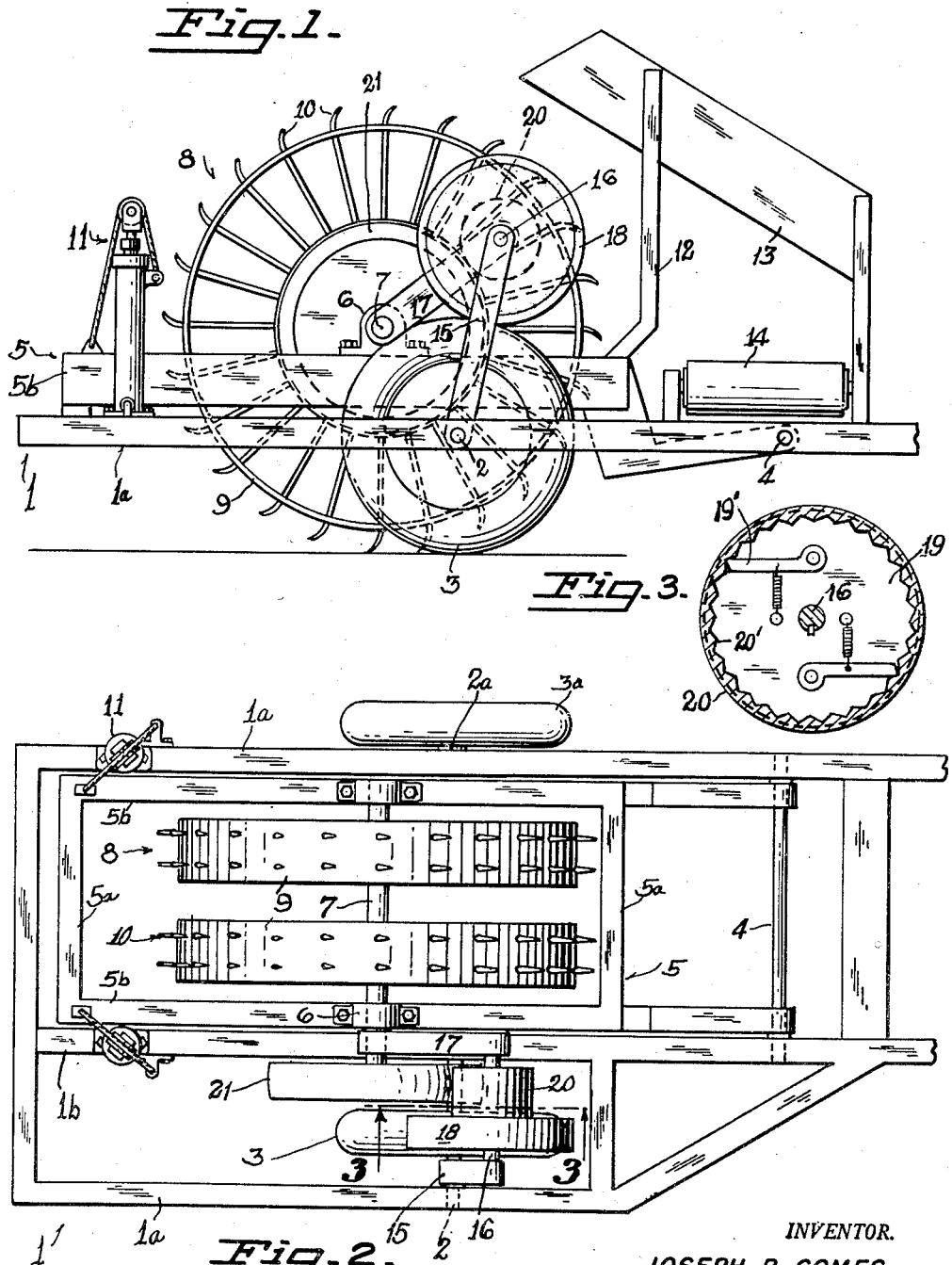
INVENTOR.
JOSEPH P. GOMES
BY
J E Trabucco
ATTORNEY 2,697,318

DRIVE MECHANISM FOR ROTARY BEET LIFTERS

Joseph P. Gomes, Salinas, Calif.

Application June 30, 1952, Serial No. 296,345

1 Claim. (Cl. 55—106)

This invention relates to improvements in beet harvesters, and more particularly to a novel drive means for a rotary beet lifter.

In my United States Letters Patent No. 2,563,030, granted August 7, 1951, covering a Rotary Beet Lifter, I disclosed chain and sprocket drive means operatively connecting the supporting wheels of the machine with a rotary spiked beet lifting wheel. The present invention provides a new and simplified drive means connecting the supporting ground wheels and the rotary beet lifting wheel, one which employs a series of rotary members arranged in peripheral contacting and driving relation one with another.

The principal object of my invention is to provide novel and simplified drive means for the rotary spiked beet lifter of a beet harvesting machine, one which operates in synchronized relation with the supporting ground wheels of the machine.

Other and further objects of my invention will be pointed out hereinafter, or will be indicated in the appended claim or will be obvious to one skilled in the art upon an understanding of the present disclosure. For the purpose of this application I have elected to show herein certain forms and details of a drive means for the rotary beet pick-up wheels of a beet harvesting machine representative of my invention; it is to be understood, however, that the embodiment of my invention herein shown and described is for the purpose of illustration only and that therefore it is not to be regarded as exhaustive of the variations of the invention.

In the accompanying drawings:

Fig. 1 is a side elevation of a rotary beet lifter showing my improved drive means operatively connecting the supporting ground wheels and the rotary beet pick-up wheels;

Fig. 2 is a top plan view of the same, omitting certain parts of the beet handling apparatus; and Fig 3 is an enlarged detailed sectional view taken on the line 3—3 of Fig. 2, showing the overdrive clutch mechanism forming an essential part of the drive means.

Referring to the drawings, the numeral 1 designates a main supporting frame, which is ordinarily towed behind a tractor or the like when the machine is in operation. The main frame comprises outer substantially parallel side members 1a, 1a and an inner substantially parallel side member 1b located adjacent one of the outer side members. Journaled on the adjacent inner and outer side members 1a and 1b of the frame is a transverse stub-shaft 2 which is aligned with a similar stub-shaft 2a journaled on the other outer frame member. Keyed, respectively, to the said stub-shafts are supporting ground wheels 3 and 3a which support the machine on the ground beneath, the said ground wheels preferably having rubber tires of the pneumatic or solid type.

Pivotally mounted as at 4 on an outer side member 1a and the inner side member 1b of the main supporting frame 1 is a sub-frame 5 having front and rear transverse members 5a and substantially parallel side members 5b, the latter having a pair of suitably spaced trunnions 6 secured thereon. Journaled on the trunnions 6 is a shaft 7 to which is keyed two (or any other suitable number of) spiked pick-up wheels 8. Each pick-up wheel 8 is of the kind commonly used on beet harvesting machines, and it comprises a circular rim 9 having a plurality of outwardly projecting annularly arranged spikes 10 projecting therefrom. The spikes 10 are preferably disposed at suitable uniform angles with respect to the rim 9, as shown in Fig. 1, thereby making it possible for them to suitably engage with beets or other root vegetables imbedded loosely in the ground. The beets become impaled on the spikes and upon the continued rotation of the wheels 8 they are carried upwardly and into engagement with a cutting device (not shown) which cuts the tops from the stalk portions. Since the present invention relates specifically to the drive mechanism for the spiked pick-up wheels 8 it is not necessary to show the usual operating parts of the beet-harvester. It is to be noted, however, that the sub-frame 5 is selectively lowered and raised by suitable hydraulic means 11 of the well known kind to move the pick-up wheels into and out of operative relationship with the ground beneath. Beet harvesters with which the present invention is used carry the usual supporting structure 12 on which are mounted knives (not shown) for cutting the tops from the stalk or root portions of the beets, an inclined chute 13 for conveying the stalks to a loading point, an endless conveyor 14 for receiving the beet tops and scrapers (not shown) for disengaging the beet tops from the spikes after the completion of the cutting operation.

The present invention comprises novel interconnecting means which maintains the spiked pick-up wheels 8 and the supporting ground wheel 3 in connected relationship so that as the machine is drawn forwardly the pick-up wheels will turn in timed relation with respect to the ground wheels. Pivotally connected at one of its ends to the stub-shaft 2 is an elongated rigid member 15 which is pivotally connected at its opposite end through a rotatable stub-shaft or pin 16 to one end of a similar rigid member 17, the latter being pivotally connected at its opposite end to the shaft 7. Keyed to the stub-shaft 16 is a wheel 18 which is provided with a metal rim, the said rim being in frictional engagement with the tire of the supporting ground wheel 3. Secured rigidly to the stub-shaft 16 and arranged in co-axial relation therewith is a clutch disc 19 which is positioned inside of and arranged in cooperative relation with a clutch wheel 20 which is loosely mounted on the stub-shaft 16. The clutch wheel is of substantially smaller diameter than the wheel 18 and it is formed with an internal annular set of teeth 20', and engaging with the latter are a plurality of pivoted spring pressed pawls 19' carried by the clutch disc 19. The pawls 19' are arranged to engage with teeth 20' of the clutch wheel 20 and operatively connect the said clutch wheel and the clutch disc 19 when the said disc is rotated in a certain direction as the machine is drawn forwardly; but upon the reverse movement of the said clutch disc or upon the clutch disc rotating at a slower speed than the clutch wheel, the said pawls will ride over the teeth of the clutch wheel without operatively connecting the said clutch wheel and clutch disc so they rotate in unison. The clutch wheel and the clutch disc comprise elements of a well known overdrive clutch mechanism, and the primary function thereof is to permit the free turning of the machine.

Keyed to the shaft 7 and arranged in co-axial relation to the pick-up wheel is a wheel 21 which is provided with a rubber tire of the solid or pneumatic type, the said tire being in frictional engagement with the periphery of the clutch wheel 20. The peripheries of the wheel 18 and the clutch wheel 20 are preferably serrated or roughened to prevent slippage and to insure the simultaneous rotation of the supporting ground wheels 3, 3a, the wheel 18, the clutch wheel 20, the wheel 21 and the pick-up wheels 8, when the machine is moving forwardly.

It will be noted that in the embodiment of my invention herein disclosed the transmission means above described is positioned only at one side of the pick-up wheels. It is to be understood, however, that duplex transmissions connecting both ground wheels 3 and 3a with the pick-up wheels 8 may be arranged at opposite sides of the pick-up wheels. It is to be noted that the relative sizes of the various wheels embodying my improved transmission may be changed to provide different speed ratios between the supporting ground wheels and the pick-up wheels.

During the operation of the beet harvester the spiked pick-up wheels 8 rotate in a clockwise direction (Fig. 1) as the machine advances. The drive means connected to and interposed between the supporting ground wheels 3, 3a and the pick-up wheels 8 provides an arrangement capable of overcoming any opposing force which might otherwise create a drag on the pick-up wheels and thereby cause them to fail to rotate in synchronized relation with the supporting ground wheels. The unbalanced load imposed by the impaled beets on the rear sides of the pick-up wheels is one force which tends to cause a slippage of the said pick-up wheels. The lack of traction sometimes due to an unfirm condition of the ground beneath is another contributing factor which, in the absence of positive drive means of the kind comprising my invention, would preclude the synchronized rotation of the supporting ground wheels and the pick-up wheels. Should there be a failure of the pick-up wheels to rotate in synchronized relation to the supporting ground wheels some of the beets might become improperly aligned on the spikes 10, a condition which would result in a considerable portion of the beet stalks being lost because of the improper engagement of such beets with the knives. The present invention avoids such an inefficient and expensive operation.

What I claim is:

In a drive mechanism, a main supporting frame, two stub-shafts mounted at opposite sides of the frame, a pair of rotatable supporting ground wheels mounted on the stub-shafts, a sub-frame mounted for up and down pivotal movement on the main frame, a drive shaft journaled on the sub-frame and arranged in substantially parallel relation to the stub-shafts, an elongated rigid member pivotally connected at one end to a stub-shaft, a pin rotatably supported on the opposite end of the elongated member, a second elongated rigid member pivotally connected at one of its ends to the pin and at its opposite end to the drive shaft, a wheel secured on the pin and arranged with its periphery in contacting driving relation with the periphery of a supporting ground wheel, a clutch disc keyed to the pin, a clutch wheel loosely mounted on the pin, clutch means interposed between the clutch wheel and the clutch disc and arranged to bring the clutch disc into driving relationship with the clutch wheel upon the rotation of the clutch disc in a certain direction, and a drive wheel keyed to the drive shaft, the peripheries of the clutch wheel and the drive wheel being in contacting driving relationship.

References Cited in the file of this patent

UNITED STATES PATENTS

| Number | Name | Date |
|---|---|---|
| 2,303,055 | Lardi | Nov. 24, 1942 |
| 2,563,030 | Gomes | Aug. 7, 1951 |